March 6, 1951 R. S. PRESCOTT 2,543,803
DETONATOR TESTING DEVICE
Filed Oct. 9, 1945 3 Sheets-Sheet 1

Inventor
R. S. PRESCOTT
By Ralph L Chappell
Attorney

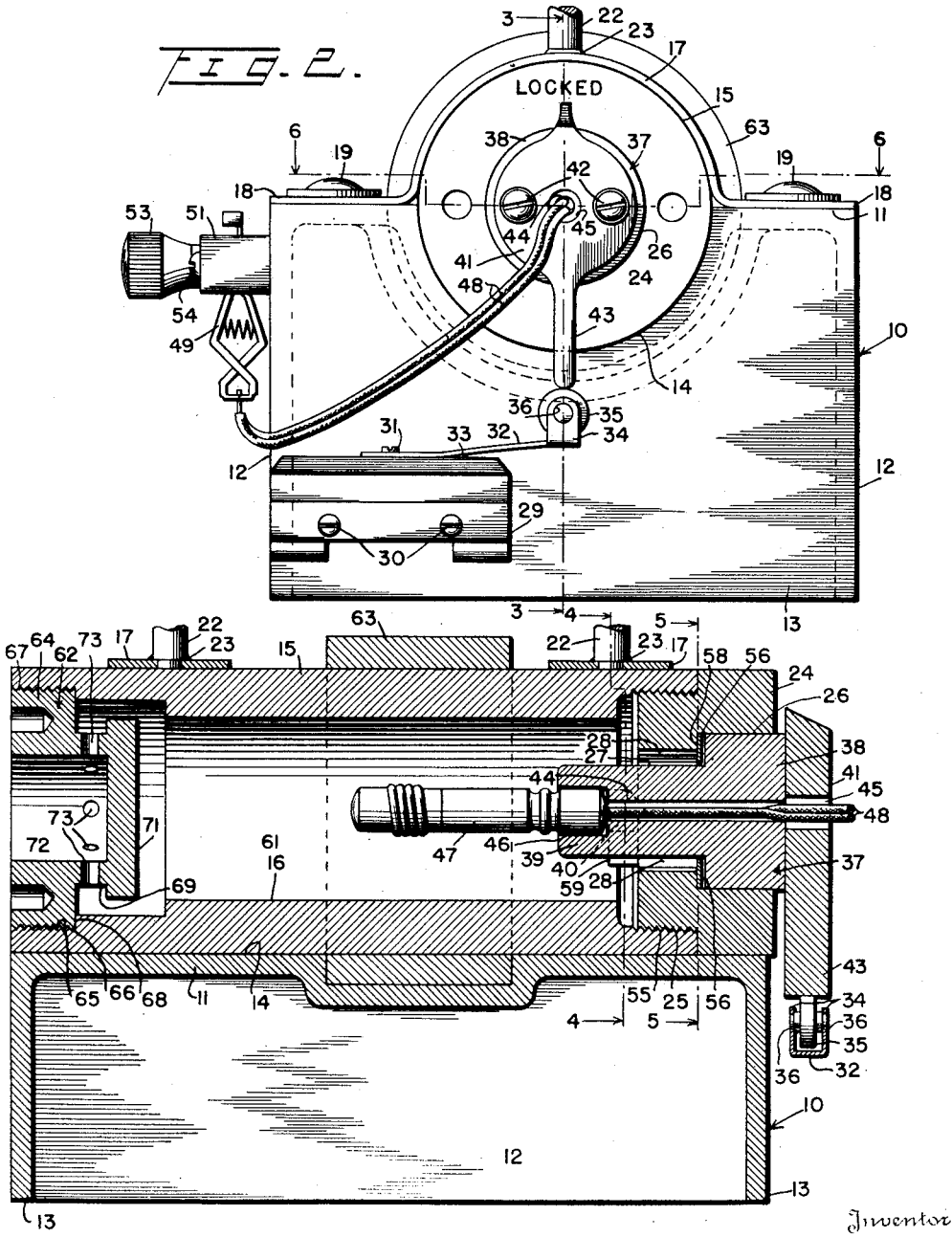

March 6, 1951  R. S. PRESCOTT  2,543,803
DETONATOR TESTING DEVICE
Filed Oct. 9, 1945  3 Sheets-Sheet 3
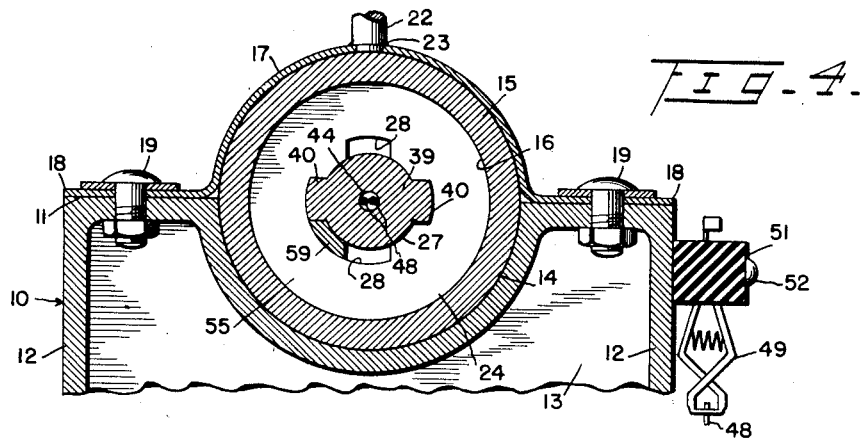
FIG. 4.
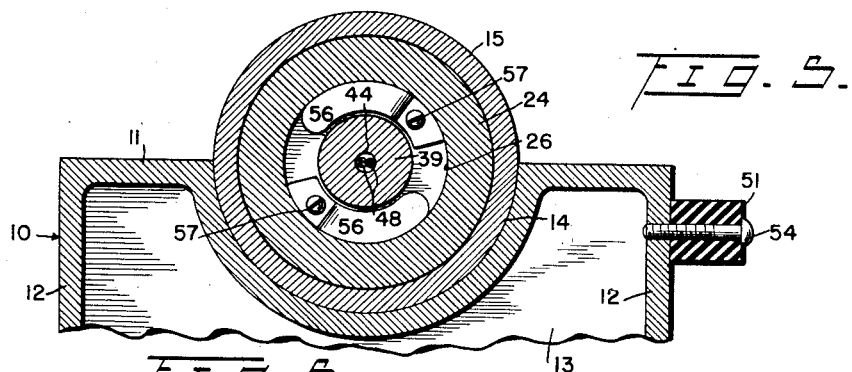
FIG. 5.
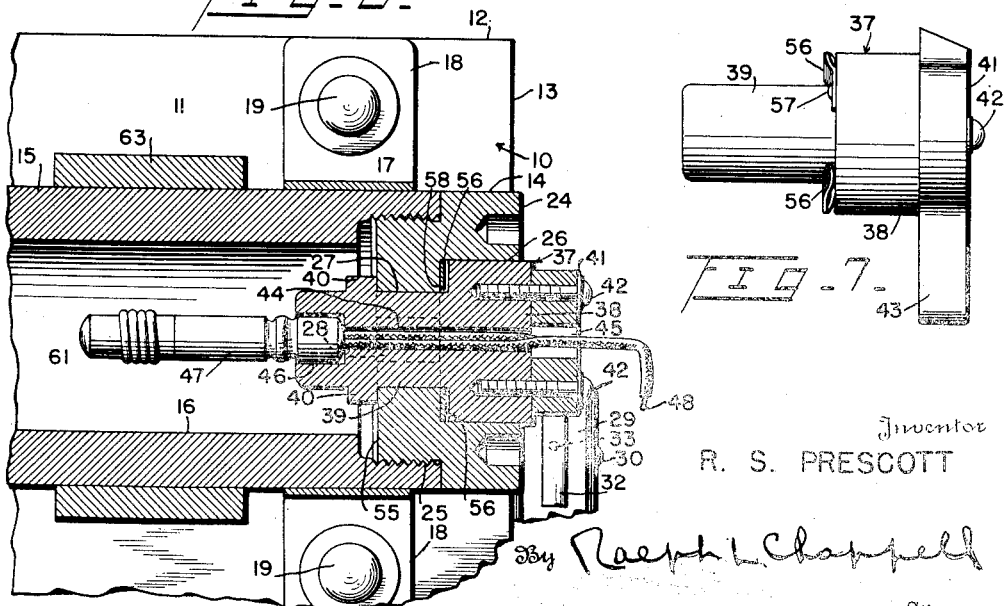
FIG. 6.
FIG. 7.
Inventor
R. S. PRESCOTT
By Ralph L. Chappell
Attorney Patented Mar. 6, 1951

2,543,803

UNITED STATES PATENT OFFICE 2,543,803

DETONATOR TESTING DEVICE

Robert S. Prescott, Washington, D. C.

Application October 9, 1945, Serial No. 621,398

5 Claims. (Cl. 175—183)

(Granted under the act of March 3, 1883, as amended April 30, 1928; 370 O. G. 757)

The present invention relates to a testing device and more particularly to a device for testing electroresponsive detonators employed with ordnance devices and the like.

The invention is designed primarily to prevent injury to personnel during testing operation inasmuch as a test circuit is not completed to the detonator until the detonator holder has been inserted into the reinforced test barrel and rotated a predetermined amount. Should the detonator explode within the test chamber provided within the reinforced barrel such an explosion will be of insufficient strength to cause bursting of the reinforced and vented test barrel.

One of the objects of the invention is the provision of a new and improved device for testing an electroresponsive detonator and having means whereby the detonator is detachably supported within the device in testing position and the electrical connections thereto are quickly and easily established.

Another object of the invention is the provision of a testing unit including means whereby the detonator supporting device is maintained in testing position within the unit after being inserted therein.

Another object of the invention is the provision of a testing device having a detonator supporting element adapted to be inserted into the device and rotated to a test position for establishing an electrical circuit to the detonator as the detonator supporting element is rotated.

A still further object is to provide a new and improved testing device which is reliable in operation and which possesses the qualities of durability and is also safe during testing operation of the detonator.

Still further objects, novel features and advantages of the invention will be apparent from the following description, taken in connection with the accompanying drawings, wherein:

Fig. 2 is a front elevational view of the testing device of Fig. 1;

Fig. 3 is a central longitudinal sectional view of the device taken substantially on line 3—3 of Fig. 2;

Fig. 4 is a detail sectional view taken on line 4—4 of Fig. 3;

Fig. 5 is a detail sectional view taken on line 5—5 of Fig. 3;

Fig. 6 is a fragmentary sectional view taken on line 6—6 of Fig. 2;

Fig. 7 is an elevation view of the detonator holder;

Figure 1:
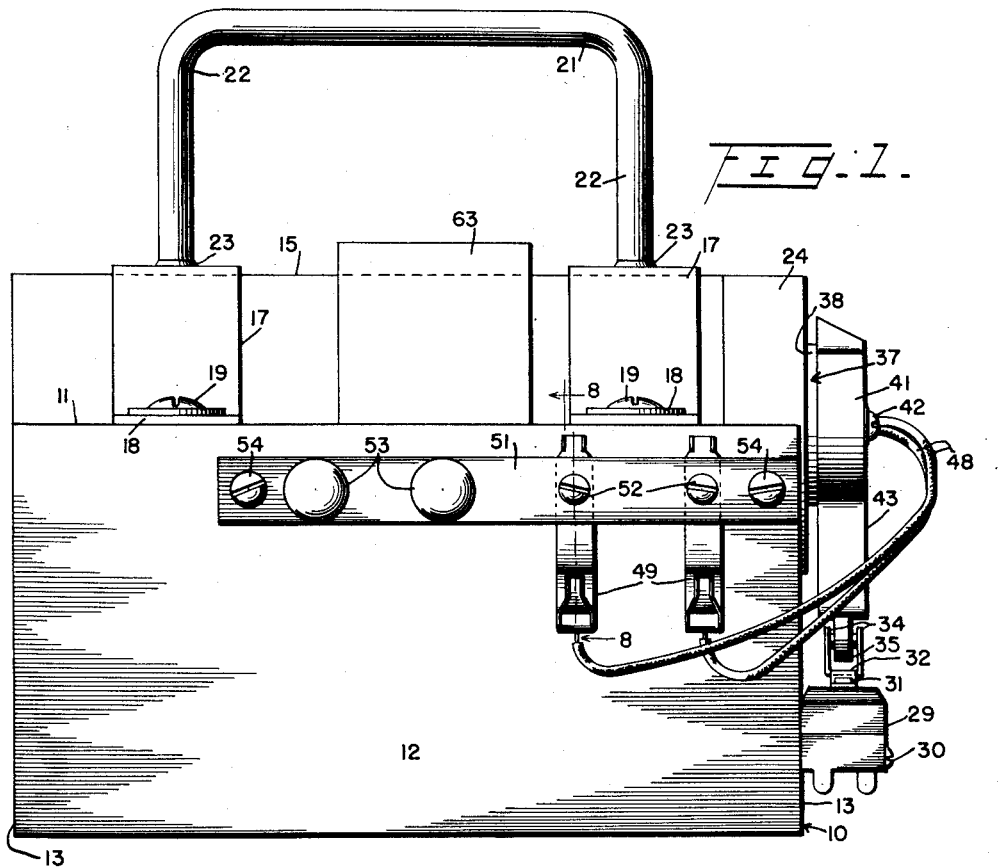
Fig. 1 is a side elevational view of a preferred form of detonator testing device constructed in accordance with the present invention.

Referring to the drawings in detail for a more complete understanding of the invention, the testing device shown thereon comprises a base generally indicated by the reference character 10 composed of any material suitable for the purpose such, for example, as aluminum or the like. The base member 10 includes an upper wall 11, side walls 12 and end walls 13. The upper wall 11 is provided with a longitudinal depression 14 extending the entire length thereof which is adapted to partially enclose a relatively thick elongated tube or barrel 15 composed of any material suitable for the purpose such, for example, as steel or the like and having a centrally disposed bore 16 extending therethrough. The barrel 15 is maintained within the depression 14 by a pair of arcuately shaped brackets 17 surrounding a portion of the barrel. Each bracket is provided with a pair of lateral extensions 18 formed thereon adapted to be respectively secured to the upper wall 11 of the base 10 by bolts or the like indicated by the reference character 19.

A handle 21 is secured to the brackets 17 in any suitable manner, preferably by welding each leg portion 22 thereof to each bracket as indicated by the reference character 23 thereby providing means for manually carrying the testing device from one place to another.

A cap or plug 24 composed of any material suitable for the purpose such, for example, as steel is threaded into an enlarged threaded portion 25 provided in one end of the bore 16 and is adapted to extend a predetermined distance therein. The plug 24 is provided with a centrally disposed bore 26 extending a predetermined distance therethrough and adapted to communicate with a reduced bore 27. A pair of diametrically arranged offset recesses or slots 28 communicate with the bore 27, the purpose of which will be more fully described as the description proceeds.

A switch suitable for the purpose such as a "Microswitch" generally indicated by the reference character 29 is supported on one of the end walls 13 of the base 10 and secured thereto by screws 30. Supported on the switch 29 and secured thereto as by a screw 31 is a resilient member 32 adapted to engage the usual contact actuating member 33 of the switch.

The resilient member has formed on one end thereof a pair of spaced ears 34 and a roller 35 is mounted between the ears by means of trunnions or the like formed on the roller which are free to rotate in bearings 36 provided in each ear 34.

A detonator holder generally indicated by the reference character 37, composed of steel or the like, is adapted to be inserted into the barrel as shown on Figs. 1, 2 and 6 of the drawings. The detonator holder comprises an enlarged head 38, the head being adapted to seat within the bore 26 provided in the cap 24, the detonator holder also having a reduced extension 39 integrally formed thereon adapted to engage the reduced bore 27 in the cap 24 thus providing a bearing surface for the detonator holder when the detonator holder has been inserted into the barrel 15. The reduced extension 39 is provided with a pair of diametrically and oppositely spaced lugs 40 adapted to enter the slots 28 when the detonator holder is inserted into the barrel. The detonator holder also comprises a member 41 secured thereto in any suitable manner preferably by screws 42 as best shown on Figs. 2 and 6 of the drawing. A radial arm 43 is formed on the member 42 and is adapted to engage the roller 35 and move the resilient member 32 into operative engagement with the contact actuating member when the detonator holder has been inserted into the barrel 15 and rotated a predetermined amount. The detonator holder and member 41 are provided with a pair of centrally disposed openings or bores 44 and 45. The opening 44 in the detonated holder is enlarged as at 46 and a detonator 47 is adapted to seat therein as shown on Figs. 3 and 6 of the drawings, the detonator being provided with the usual pair of electrical leads 48 at one end thereof and secured to the detonator in any suitable manner. The leads 48 are threaded through the openings 44 and 45 respectively provided in the detonator holder 37 and the member 41, the other end of each of the leads 48 being releasably connected to a pair of test clips 49 respectively, the clips being secured to a "Bakelite" block or the like 51 by screws 52 whereby an electrical test circuit may be supplied to the detonator. Secured to the block 51 is a pair of test terminals 53, providing means whereby a test set of any well known type may be electrically connected thereto. A test circuit is thus provided to the detonator 47.

The "Bakelite" block is secured to one side wall of the base 10 in any suitable manner preferably by screws 54 as shown on Figs. 1, 2 and 5 of the drawings.

On Figs. 1, 2, 4, 5 and 6 of the drawings the detonator holder 37 is shown inserted into the barrel 15 and rotated to the locked or test position therein. The lugs 40 now engage the inner surface 55 of the plug 24 and are maintained in contact therewith by a pair of arcuately shaped springs 56 secured to the head 38 of the detonator holder 37 by screws 57 or the like. The springs 56 are adapted to engage a shoulder 58 provided within the cap 24 and thus in response to the outward pressure exerted on the detonator holder by the springs 56 the lugs are maintained in frictional engagement with the surface 55 thereby maintaining the detonator holder 37 in test position within the barrel 15.

It will be understood, however, that when the detonator holder is in the position shown on Figs. 1, 2 and 3 of the drawings, the arm 43 formed on the member 41 engages the roller 35 mounted on the resilient member 32 and forces the spring into engagement with the contact actuating element 33 of the switch 29 whereby a circuit is completed to the detonator 47 and an electrical impulse is adapted to be supplied to the detonator from a suitable source of power. It will be further understood that when the detonator holder is inserted into the barrel 15 the holder is held in a position at a right angle to that shown on the drawings so that the lugs 40 may readily pass through the recesses 28 in the plug 24. When this has been done the detonator holder 37 is rotated in a clockwise direction and the lugs 40 are rotated until one of the lugs engages a stop 59 formed on the rear surface of the cap 24 as shown on Figs. 3 and 4 of the drawings thereby preventing further rotation of the detonator holder 37 within the barrel 15. The test unit is now in a test position within the barrel.

As shown on Fig. 3 of the drawings, an explosive chamber 61 is provided within the barrel between the inner surface of the plug 24 and a vent plug generally indicated by the reference character 62. The intermediate portion of the barrel 15 is reinforced by an annular member 63 secured thereto in any suitable manner such, for example, as by sweating the annular member thereon to increase the strength of the barrel sufficiently to prevent bursting thereof should a detonator fire therein during testing operation.

The vent plug 62 comprises a body portion 64 having a screw threaded portion 65 thereon adapted to have threaded engagement with an internally threaded portion 66 provided in one end of the barrel 15. The plug has a flange 67 thereon adapted to seat against a shoulder 68 provided on the barrel 15 in such a manner as to seal the end of the barrel, as best shown on Fig. 3 of the drawings. A reduced portion 69 formed on the body portion 64 of the plug 62 and integrally formed thereon provides a deflector head on baffle plate 71. A bore 72 extends a predetermined distance into the vent plug and communicates with a plurality of apertures 73 provided in the reduced portion 69 thus providing means whereby the explosive chamber 61 is vented should a detonator explode therein during testing operations. It will be understood, however, that the venting arrangement of the baffle plate or deflecting head 71 is such that high velocity particles of the detonator during explosion thereof are effectively stopped thereby, but the gas formed by the explosion will escape through the vent apertures 73 arranged in the reduced portion 69 of the vent plug, the apertures being positioned behind the baffle plate.

Figures 8, 9:
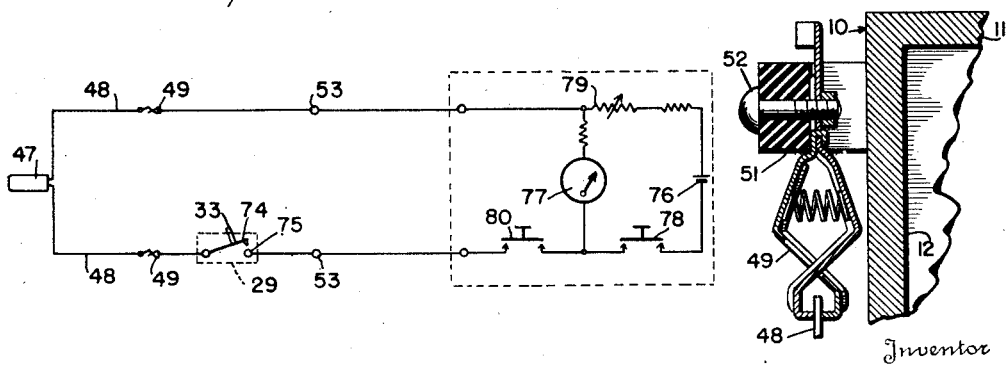
Fig. 8 is a detail sectional view taken substantially on line 8—8 of Fig. 1.
Fig. 9 illustrates in diagrammatical form an electrical circuit suitable for use with the testing device.

Fig. 9 illustrates in diagrammatical form an electrical circuit suitable for use with the testing device, the circuit including the switch 29 having a movable contact 74 normally out of engagement with a stationary contact 75. It will be understood, however, that when the detonator holder 37 is inserted into the barrel 15 and rotated to the test or locked position, the arm 43 of the detonator holder will engage the roller 35 on the resilient member 32 thereby actuating the member 33 and forcing the movable contact 74 into engagement with the stationary contact 75 thus connecting the detonator 47 in series with the test set. The test set may be of any suitable type but for the purposes herein it may comprise a battery 76, an ohmmeter 77, connected in parallel with the battery, a switch 78 being connected therebetween in order that the ohmmeter may be adjusted to the zero position thereof by varying the setting of a potentiometer 79. Another switch 80 is provided between the meter and the detonator thereby to prevent current from flowing to the detonator while the meter is being adjusted to zero. After the meter has been adjusted to the zero position, switch 78 is maintained in the closed position and switch 80 is closed, thereby completing a circuit from battery 76 to the detonator 47 through the switch 29 when the movable contact 74 is in engagement with the contact 75 thereof.

In accordance with the circuit arrangement of Fig. 9 the detonator 47 is employed as an unknown shunt resistance and the current flowing through the meter 77 gives an indication of the resistance of the detonator under test.

It will be apparent from the foregoing description that the testing device is constructed in such a manner as to be safe at all times during testing operations inasmuch as the detonator is not connected in series with the test set until the detonator holder has been inserted into the barrel and rotated to a test and locked position. The push button switches 78 and 80 of the test set are now actuated to the closed position.

The ohmmeter 77 is designed to pass a test current therethrough of only a small fractional part of the current normally required to operate the detonator 47, and should the detonator be defective the ohmmeter will indicate the object. If the detonator should explode for any reason by application of the test current thereto, the explosion will occur within the barrel 15, thus confining the high velocity particles of the exploded detonator therein, thereby preventing injury to the operator as the barrel is so constructed as to withstand the force of the explosion.

The many advantages of the detonator testing device constructed in accordance with the present invention will be readily apparent from the foregoing description and, although a preferred embodiment of the device is illustrated and described, it is to be understood that changes in the details of construction and in the combination and arrangement of parts may be resorted to which fall within the scope of the invention as claimed.

The invention described herein may be manufactured and used by or for the Government of the United States of America for governmental purposes without the payment of any royalties thereon or therefor.

What is claimed as new and desired to be secured by Letters Patent of the United States is:

1. A detonator testing device of the class described for connection to an electrical test circuit comprising a base member, a barrel supported on said base member, an annular member for reinforcing said barrel intermediate the ends thereof, a removable detonator holder having a recess in one end thereof for detachably supporting a detonator therein, said detonator holder being adapted to be inserted into said barrel and rotated therein to a locked position, means including a pair of lugs on said detonator holder and in engagement with said barrel for locking said detonator holder within said barrel when the detonator holder has been rotated a predetermined amount, means including a normally open switch on said base member for electrically connecting the detonator to said test circuit as the switch is closed, and an arm on the detonator holder for closing said switch as the detonator holder is rotated to said locked position.

2. A detonator testing device of the class described comprising a base member, a barrel supported on said base member, said barrel including an annular member sweated thereon intermediate the ends thereof for reinforcing the barrel, a removable detonator holder rotatably supported within said barrel and adapted to detachably support a detonator, said detonator holder being adapted to close one end of said barrel and to be rotated to a locked position within the barrel, means including a pair of lugs on said detonator holder in engagement with said barrel for locking the detonator holder in said locked position when the detonator holder is rotated a predetermined amount, means including a pair of spring members on the holder and in engagement with the barrel for maintaining the holder in said locked position, means including a switch on said base member for electrically connecting the detonator to an electrical test circuit, means on said detonator holder for actuating said switch as the detonator holder is rotated to said locked position, and means for enclosing the other end of said barrel thereby to provide an explosive chamber, said last named means having a plurality of apertures arranged therein for venting the chamber.

3. A detonator testing device of the class described comprising a base member having a longitudinal recess formed therein, a barrel arranged in said recess, means for maintaining said barrel secured to said base member within said recess, means for reinforcing said barrel intermediate the ends thereof, a removable detonator holder rotatably supported within the barrel and having a detonator detachably supported thereby, said detonator holder being adapted to be rotated from an initial position to a test position within said barrel, means including a plurality of lugs in engagement with said barrel for locking the detonator holder in said test position, means including a plurality of resilient members in engagement with said barrel for maintaining the holder in said test position, means including a switch on said base member for electrically connecting the detonator to an electrical test circuit, a resilient member secured to said switch and adapted to actuate the switch as the detonator holder is rotated, a roller supported on said resilient member, and means on said detonator holder for engaging said roller thereby to cause actuation of the switch as the detonator holder is rotated to said test position.

4. In a detonator testing device of the class described, in combination, a base member, a barrel supported on said base member, an annular member surrounding said barrel and sweated thereon intermediate the ends thereof for increasing the strength of said barrel, a detonator holder adapted to detachably support an electroresponsive detonator and having a pair of leads extending therefrom, said detonator holder being adapted to be inserted into the barrel and rotated to a test position therein, a pair of lugs on said detonator holder in engagement with said barrel for locking the detonator holder in said test position when the detonator holder has been rotated a predetermined amount, a pair of spring members on said holder in engagement with the barrel for maintaining the holder locked in said test position, a pair of electrical terminals for securing said leads thereto, circuit means including said pair of terminals for connecting a test circuit to the detonator as the detonator holder is rotated to said test position.

5. In a device of the class disclosed for testing an electroresponsive detonator and connecting a test circuit thereto, in combination, a support having a longitudinal recess formed therein, a barrel arranged in said recess, means including a pair of spaced members for maintaining said barrel secured to the support within said recess, an annular rib for reinforcing the barrel intermediate the ends thereof, a removable test unit rotatably supported within the barrel for detachably supporting the detonator thereon and constructed and arranged to be rotated from an initial position to a test position within the barrel, a plurality of lugs secured to said test unit and in engagement with the barrel for locking the test unit in said test position, a plurality of spring devices on the test unit in engagement with the barrel for maintaining the unit locked in said test position, means including a switch on said support and operatively connected to said test circuit for electrically connecting the detonator to said test circuit as the switch is actuated to a closed position, a resilient member secured to said switch for actuating the switch as the resilient member is moved a predetermined amount, a roller supported on said resilient member, and an arm secured to said test unit and adapted to engage the roller and move the resilient member said predetermined amount as the unit is rotated to said test position.

ROBERT S. PRESCOTT.

REFERENCES CITED

The following references are of record in the file of this patent:

UNITED STATES PATENTS

| Number | Name | Date |
| --- | --- | --- |
| 755,514 | Meigs et al. | Mar. 22, 1904 |
| 772,245 | Meigs et al. | Oct. 11, 1904 |
| 956,877 | Beattie | May 3, 1910 |
| 1,714,071 | Biles | May 21, 1929 |
| 1,869,646 | Anderson | Aug. 2, 1932 |
| 2,163,475 | Tomalis | June 20, 1939 |
| 2,208,558 | Appleton | July 23, 1940 |
| 2,492,459 | Bondurant | Dec. 27, 1949 |